Sept. 13, 1960 C. W. MacMILLAN 2,952,435
ADAPTER RING FOR WHEEL BALANCERS
Filed Oct. 7, 1958 2 Sheets-Sheet 1
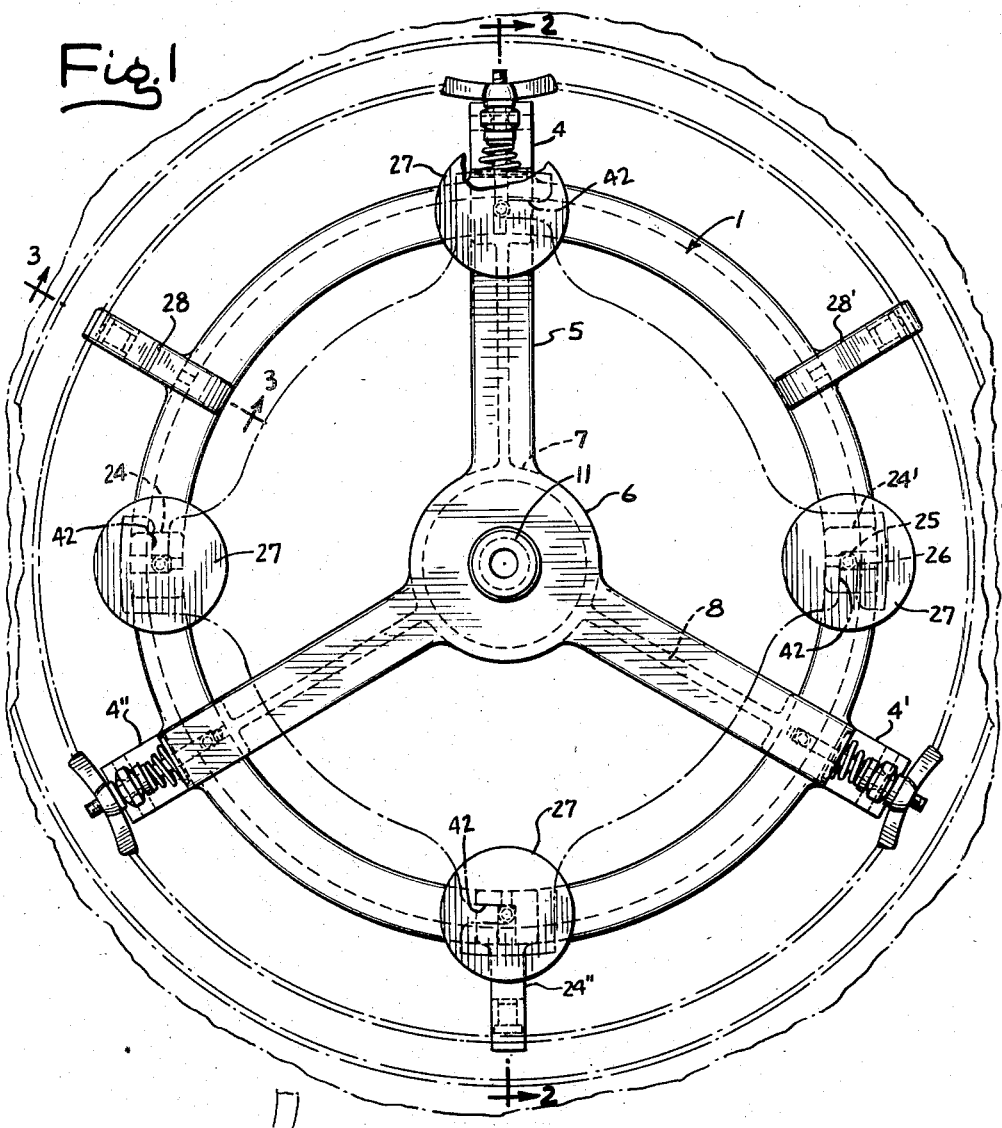
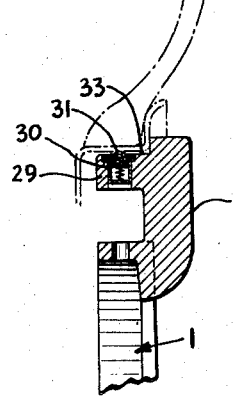
INVENTOR
CHARLES W. MacMILLAN
by: Gary, Desmond & Parker
ATTYS Sept. 13, 1960    C. W. MacMILLAN    2,952,435
ADAPTER RING FOR WHEEL BALANCERS
Filed Oct. 7, 1958    2 Sheets-Sheet 2
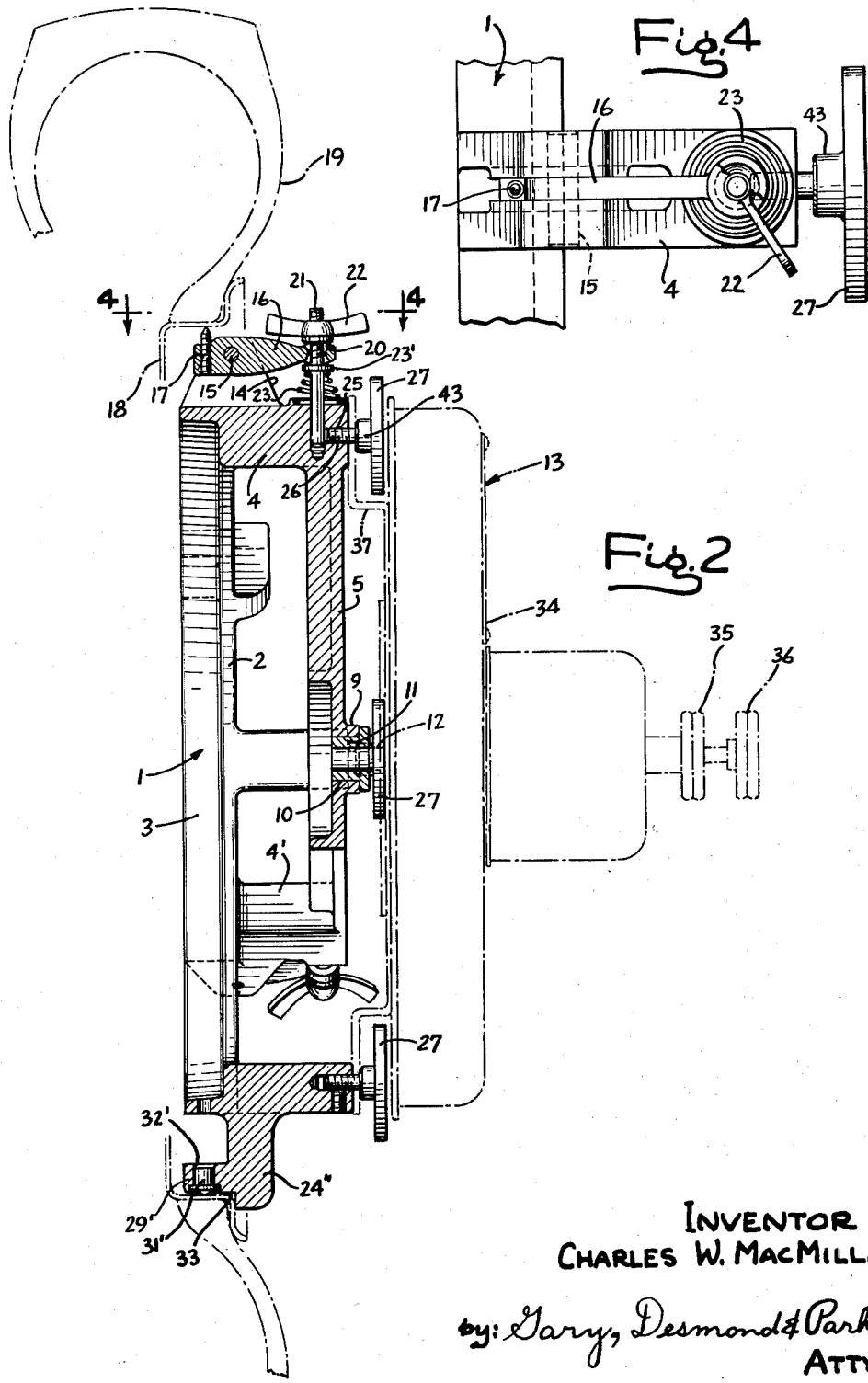
INVENTOR
CHARLES W. MacMILLAN
by: Gary, Desmond & Parker
ATTYS.

United States Patent Office 2,952,435
Patented Sept. 13, 1960

2,952,435
ADAPTER RING FOR WHEEL BALANCERS

Charles W. MacMillan, Rock Island, Ill., assignor to Bear Manufacturing Company, Rock Island, Ill., a corporation of Delaware Filed Oct. 7, 1958, Ser. No. 765,804

5 Claims. (Cl. 248—205)

This invention relates to improvements in an adapter mechanism for facilitating the mounting of a conventional automobile wheel balancing device upon an automobile wheel whereby the axis of rotation of the wheel balancing device may be positioned coaxially with the axis of rotation of the automobile wheel under test.

In those types of wheel balance testing devices, commonly referred to as wheel balancers, which test the dynamic and static balance of an automobile wheel without removing the wheel from the automobile, it is essential that the axis of rotation of the rotating parts of the balancer be disposed substantially coaxial with the axis of rotation of the wheel under test. To accomplish this relationship an adapter mechanism or adapter plate is employed. The adapter mechanism or plate is secured to the automobile wheel and, in turn, the balancer is secured to the adapter plate.

The present invention is directed to an adapter plate of the type hereinbefore described and features mechanisms which permit the firm securement of the plate upon the wheel and mechanisms whereby the plate can be conveniently centered upon the wheel. The plate comprising the present invention, in turn, carries mechanisms of constant relationship to each other which permit the wheel balancer to be centered on, and secured to, the plate.

The adapter plate embodying the concepts of the present invention is of simple and rugged construction and permits an operator properly to mount a wheel balancer upon a wheel under test in a minimum period of time.

The advantages and other features of the present invention will be more apparent from the accompanying drawings and following detailed description.

In the drawings,

Fig. 1 is an elevational view of the adapter plate embodying the concepts of the present invention.

Fig. 2 is a sectional view taken on line 2—2 of Fig. 1.

Fig. 3 is a detailed sectional view taken on line 3—3 of Fig. 1.

Fig. 4 is an enlarged detailed plan view of one of the adapter plate gripping devices, looking in the direction of the arrows 4—4 of Fig. 2.

Referring in detail to the drawings, 1 indicates a ring which is constructed of metal, the ring having an angle cross-section and comprising an annular web portion 2 and an annular flange portion 3. Extending outwardly at substantially right-angles to the plane of the ring are three integral gripping blocks 4, 4' and 4'', said blocks being angularly spaced 120° from each other. An arm or spoke 5 is connected, at one end, to each block and said spokes are preferably formed integral with the blocks, the opposite ends of said arms terminating in an integral hub 6. It will be noted that because of the offset relationship of the blocks 4, 4' and 4'' to the ring 1, the plane of the arms 5 and hub 6 is spaced outwardly from the plane of the ring. The hub 6 and arms 5 carry ribs 7 and 8 respectively to reinforce the arm and hub structure.

A boss 9 is carried at the central portion of the hub and said boss is provided with a central aperture 10 in which a bushing 11 of hardened metal is positioned, said bushing being provided for the reception of a centering pin 12 carried by a conventional wheel balancer 13, as will be hereinafter more fully described.

A pair of spaced lugs 14 are carried by the ring 1 and each block 4, 4' and 4'', each pair of said lugs being bridged by a pivot pin 15. A gripping arm 16 is carried by each pin 15 and at one end of each arm a pointed gripping screw 17 is threadedly carried. As will be hereinafter more fully described, the pointed ends of the screws 17 are adapted to make gouging engagement with an automobile rim 18 upon which a tire 19 may be mounted.

The opposite end of each gripping arm 16 is provided with an aperture 20 through which a screw 21 loosely extends. Each screw 21 makes threaded engagement with a block 4, 4' and 4'' and a winged nut 22 threadedly engages each screw at the outer portion thereof. A conical compression spring 23 embraces each screw 21 and is confined between a washer 23' which loosely embraces screw 21 and which bears upon the inner portion of an arm 16 and an outer portion of a block 4, 4' and 4'' whereby arm 16 is normally urged in a counterclockwise direction about pivot pin 15, as viewed in Fig. 2.

The ring 1 also carries a plurality of angularly spaced abutment blocks 24, 24' and 24'', said blocks being angularly spaced substantially 90° from each other. Each of the blocks 24, 24' and 24'' is provided with apertures 25 for the reception of screws 26. The end of each screw 26 carries a knob or disc 27. The arrangement is such that the abutment blocks 24 and 24' are spaced 90° from the block 4. Consequently, the blocks 24, 24', 24'' and 4 are in quadrature with respect to each other. As will be hereinafter more fully described, the abutment blocks 24, 24', 24'' and the block 4, in cooperation with the screws 26 carried by said blocks, function to secure the balance testing device 13 upon the adapter.

The ring 1 also carries a pair of lugs 28 and 28' and each lug carries a finger portion 29 which is provided with an aperture 30 in which a spring-pressed button assembly 31 is positioned. The lugs 28 and 28' are spaced 120° from each other and each of said lugs is spaced 120° from the block 24''. The block 24'' also carries a finger portion 29' (Fig. 2), which corresponds to the finger portion 29 carried by the lugs 28 and 28'. The finger portion 29' carries a spring-pressed button assembly 31' similar to the assembly 31.

Thus the block 24'' functions in a dual capacity, that is, to carry one of the screws 26 by which the balance testing device is mounted upon the adapter and also functions in the same capacity as the lugs 28 and 28', that is, to carry a spring-pressed button assembly 31' corresponding to the assemblies 31 carried by the lugs 28 and 28'.

Each of the lugs 28 and 28' and the block 24'' is provided with a shoulder portion 33. In the use of the adapter, the ring 1 is disposed in plane-parallel relationship with the rim 18 of the wheel. The buttons 31 carried by the lugs 28 and 28' and the button 31' carried by block 24'' resiliently engages spaced portions of the rim 18 to substantially center the ring 1 with respect to the axis of rotation of the wheel.

During the operation hereinbefore described with respect to the lugs 28, 28' and block 24'', the winged nuts 22 are so manipulated as to permit the coil springs 23 to urge the arms 16 in a counterclockwise direction as viewed in Fig. 2. In this fashion the pointed screws 17 carried by the arms 16 are spaced from the inner portion of the rim 18 and thus the pointed ends of said screws can be moved within the rim 18. This permits the insertion of the ring 1 within the rim. When the ring has been so positioned the winged nuts 22 may be manipulated to rock the arms 16 in the opposite direction whereby the pointed ends of the screws 17 engage the inner surface of the rim 18. Thus, by tightenning the winged nuts 22 the pointed portion sof the screws 17 engage the inner surface of the rim in a gouging fashion. It will be noted that by virtue of the angular or arcuate movement of the pointed screws 17 about the pivot pins 15, the pointed screws 17 not only radially wedge the ring 1 within the rim but tend to draw said ring inwardly toward the wheel.

The balance testing device 13 is of conventional construction such as shown and described in my copending application Serial No. 442,627 filed July 12, 1954, and comprises a casing 34 within which the conventional gears and movable weights of the tester are housed, the gears and weights being manipulated by control knobs 35 and 36. To mount the tester 13 upon the adapter, radially extending arms 37 are carried by the casing 34 of the tester, the end portions of said arms being provided with slots 42 which engage with bosses 43 formed integral with the knobs or manipulating discs 27. In thus engaging the tester arms with the adapter the centering pin 12 of the tester is positioned in the bushing 11.

Under normal circumstances and depending upon the guidance of the spring-pressed buttons 31 and 31', the tester 13 will be disposed in approximate coaxial position with respect to the axis of rotation of the wheel under test. However, normally it will be found that the tester is somewhat eccentric with respect to the axis of rotation of the wheel. When such a condition is encountered the wing nuts 22 may be so manipulated as to bring the centering pin 12 together with the adapter into substantially exact coaxial relationship with the axis of the rotation of the wheel. It can readily be seen that by selectively loosening and tightening various of the wing nuts 22, the position of the adapter, within limits, can be adjusted relative to the axis of rotation of the wheel.

As has been hereinbefore described, it will be noted that the block 4 has a dual function. One of its functions is to carry the rocking arm arrangement whereby the pointed screws 17 may be adjusted and another of its functions is to receive a screw 26 whereby the balance tester may be mounted upon the adapter. In similar fashion, the block 24'' functions as a means for carrying a tester securement screw 26 and also has a lug for carrying one of the spring-pressed buttons 31'. By virtue of the blocks 4, 4', 4'', which are disposed 120° apart, and by virtue of the lugs 28, 28' and block 24'', which are also disposed 120° apart, the adapter makes contact at six places upon the rim 18, the points of contact being 60° apart.

It is recognized that many unpatentable modifications of the present invention will occur to those skilled in the art and, hence, it is not intended that the present invention be limited to the exact details shown and described except as necessitated by the appended claims.

I claim as my invention:

1. An adapter for mounting an automobile wheel-balance tester upon an automobile wheel which comprises, a ring provided with an aperture for the reception of a centering pin of a wheel-balance tester, a plurality of centering lugs carried by said ring for contacting spaced arcuate portions of an automobile tire rim, a plurality of gripping blocks carried by said ring and equally spaced angularly from said centering lugs, said gripping blocks comprising levers pivotally mounted on said ring, substantially radially adjustable means carried by said levers for gripping said automobile tire rim, means for actuating the levers, and means carried by said ring for securement of a wheel-balance tester to said ring with the centering pin thereof in said aperture.

2. An adapter for mounting an automobile wheel-balance tester upon an automobile wheel which comprises, a ring provided with an aperture for the reception of a centering pin of a wheel-balance tester, three centering lugs carried by said ring and spaced substantially 120° apart for contacting spaced arcuate portions of an automobile tire rim, three gripping blocks carried by said ring and spaced substantially 120° apart, each of said gripping blocks being respectively spaced from each centering lug by an angle of substantially 60°, said gripping blocks comprising three levers pivotally mounted on said ring, substantially radially adjustable means carried by said levers for gripping said automobile tire rim, means for actuating the levers, and means carried by said ring for securement of a wheel-balance tester to said ring with the centering pin thereof in said aperture.

3. An adapter for mounting an automobile wheel-balance tester upon an automobile wheel which comprises, a ring provided with an aperture for the reception of a centering pin of a wheel-balance tester, said ring being of a diameter smaller than the tire rim of said automobile wheel to fit substantially centrally within the rim, a plurality of centering lugs carried by said ring for contacting spaced arcuate inner portions of the automobile tire rim, a plurality of gripping blocks carried by said ring and equally spaced angularly from said centering lugs, said gripping blocks comprising a plurality of levers pivotally mounted on said ring and swingable in planes which include the axis of said ring, substantially radially adjustable means carried by said levers for gripping said automobile tire rim, means for actuating the levers, and means carried by said ring for securement of a wheel-balance tester to said ring with the centering pin thereof in said aperture.

4. An adapter for mounting an automobile wheel-balance tester upon an automobile wheel which comprises, a ring provided with an aperture for the reception of a centering pin of a wheel-balance tester, a plurality of centering lugs carried by said ring, a spring-pressed radially movable button carried by each lug for resiliently contacting spaced arcuate portions of an automobile tire rim, a plurality of gripping blocks carried by said ring and equally spaced angularly from said centering lugs, each of said gripping blocks comprising substantially radially movable friction engaging means for frictionally gripping said automobile tire rim, and means carried by said ring for securement of a wheel-balance tester to said ring with the centering pin thereof in said aperture.

5. An adapter for mounting an automobile wheel-balance tester upon an automobile wheel which comprises, a ring provided with an aperture for the reception of a centering pin of a wheel-balance tester, a plurality of centering lugs carried by said ring, a spring-pressed radially movable button carried by each lug for resiliently contacting spaced arcuate portions of an automobile tire rim, a plurality of gripping blocks carried by said ring and equally spaced angularly from said centering lugs, each of said gripping blocks carrying a lever arm pivoted thereon, a friction engaging means carried by each lever arm, means carried by each block for swinging the lever arm to move the friction engaging means into frictional contact with the automobile tire rim to lock the ring upon the rim, and means carried by said ring for securement of a wheel-balance tester to said ring with the centering pin thereof in said aperture.

References Cited in the file of this patent

UNITED STATES PATENTS

| | | |
|---|---|---|
| D. 184,619 | Hemmeter | Mar. 17, 1959 |
| 2,675,200 | Wohlforth | Apr. 13, 1954 |